Figure 1:
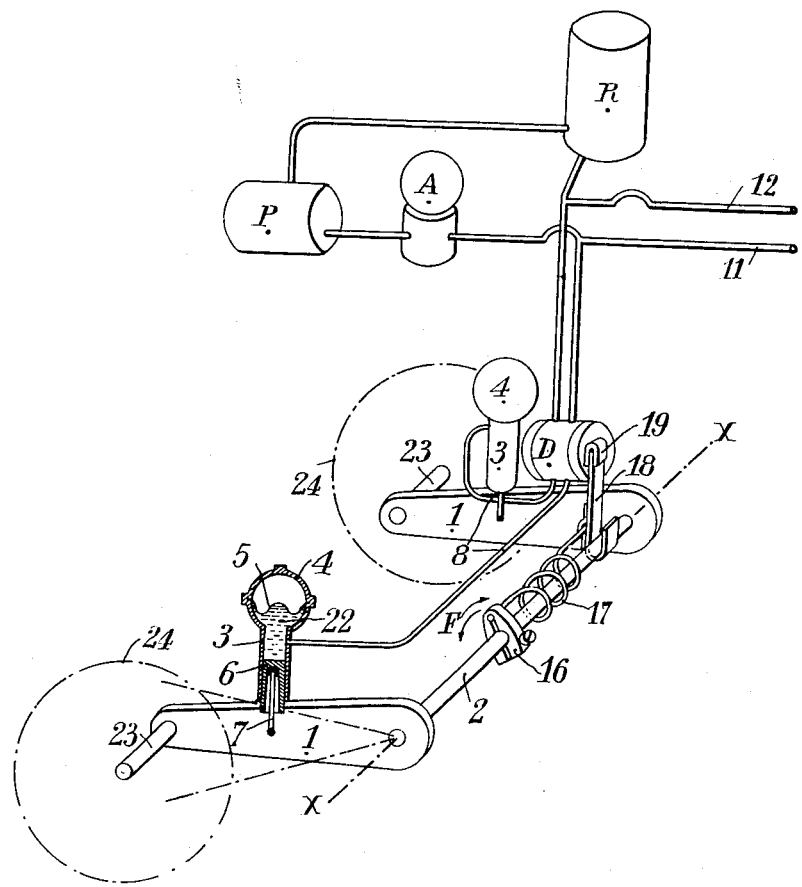

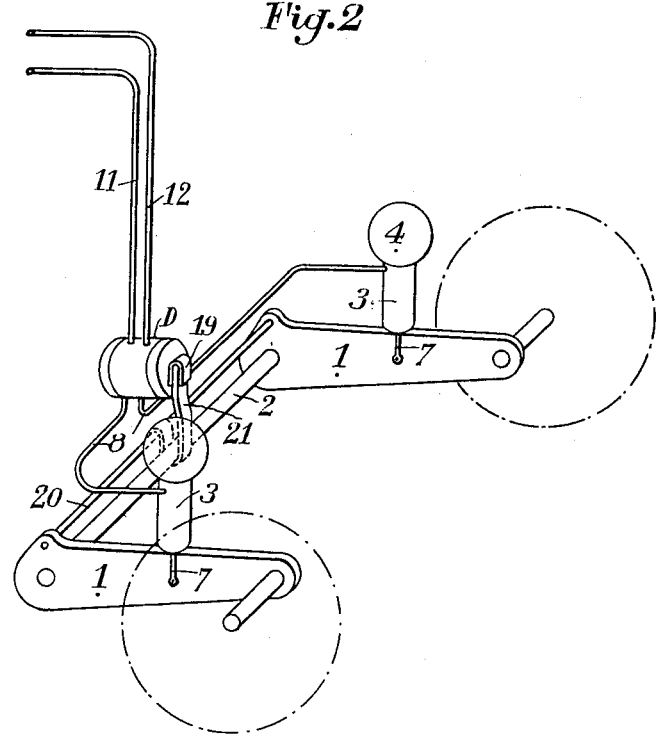
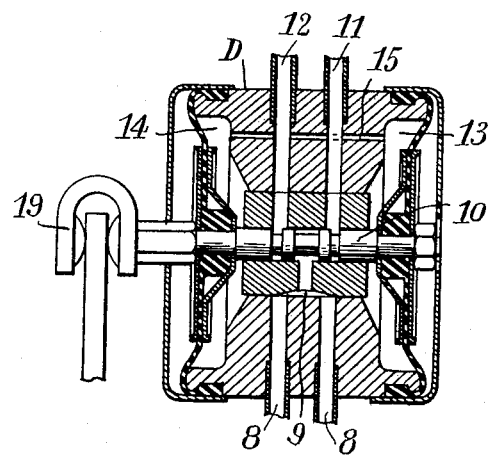

United States Patent Office 2,757,376
Patented July 31, 1956

2,757,376

AUTOMATIC LOAD RESPONSIVE SUSPENSION FOR VEHICLES

Antoine Brueder, Paris, France, assignor to Société Anonyme André Citroën, Paris, France Application April 12, 1954, Serial No. 422,635

Claims priority, application France November 30, 1953

3 Claims. (Cl. 280—124)

This invention relates to a vehicle stabilizing device for maintaining a vehicle at a uniform height from the ground at all times.

Devices for this purpose have been heretofore proposed, but the prior proposals have had the serious disadvantage of involving complicated constructions necessitated by providing for continual adjustments of stabilizing assemblies at each wheel.

The chief object of this improvement is to effect a differential control of the adjustment members fitted on each wheel which only come into action for restoring the uniform height from the ground when the latter varies in the axial part of the vehicle; to this end, a member connects the wheels of each set and absorbs the load difference between them, while a single distributor for each set of wheels operates the adjustment members when the level varies of the axial part of the vehicle above the ground.

To this end, the springing of the vehicle is constituted for each pair of wheels by arms which support the axles of the wheels and are articulated around an axis formed by a torque bar, called an "anti-rolling" bar.

On each side of the chassis an elastic capacity closed cylinder is fixed, whose piston is connected to the corresponding springing arm.

The two cylinders of a set are connected to each other by a distributor, to a pressure accumulator, a pump and a hydraulic tank.

A lever is fixed to the torque bar, whose movement, being function of the height of the set of wheels when considered with relation to the ground, reacts on the distributor control that automatically acts on the two distributors of the set for restoring balance.

A detailed description will be given hereinafter, making reference to the attached drawings which give the diagram of an installation according to the invention, applied to the chassis of an automobile vehicle provided with hydropneumatic suspension.

Figures 1 and 2 are diagrams of the installation of the front and rear wheel sets, and Figure 3 is a cross-section of the distributor.

For the front and rear, the suspension comprises two arms 1 connected by joints, on the one hand, to the axles 23 of the wheels 24, and on the other hand, to the chassis around the axis $x$—$x$. They are connected to each other by a torque bar 2 called an "anti-rolling" bar. Cylinders 3 are fixed on the chassis of the vehicle, each provided at its upper part with an elastic capacity 4 comprising a membrane 5 forming a separation between the compressed air in the space 4 and the liquid 22 in the cylinder 3; a piston 6 slides in the latter, connected by a connecting rod 7 to the arm 1.

When the angular movement of the arm 1 takes place around the axis $x$—$x$, the piston moves while causing the volume of air compressed in the space 4, to alter. To a given load on the wheel, there is a corresponding clearly defined pressure of the liquid contained in the cylinder 3 and the air contained in the space 4. By causing the quantity of liquid comprised between the piston 6 and the membrane 5 to vary, the position of the piston in the cylinder 3 is made to vary, and consequently, the position of the arm 1 in relation to the chassis of the vehicle, hence the height of the latter from the ground.

The variation of the volume of liquid in the cylinders is obtained in the following manner, given by way of example:

The vehicle is provided with a hydraulic pressure unit made up of a tank R, a pump P and a pressure accumulator A.

The front and rear axles each possess a distributor D whose operating puts the cylinders 3 either in the admission or exhaust position; the cylinders of one and the same axle are in regular communication with each other by means of piping 8, connected together by the pipe 9 to the interior of the body of the distributor D (Figure 3).

The cylinders of one and the same axle are thus always under the same pressure.

It is the presence of the anti-rolling bar 2 which enables this idea to be carried out, for this bar absorbs the load difference between the two wheels, while obviously permitting a heeling of the vehicle on the heavier loaded side, such heeling being a function of the rigidity of the anti-rolling bar.

The distributor D consists of a simple slide-valve 10 whose movement to the right or left, puts the piping 8 either into communication with the piping 11 coming from the pressure accumulator A, or with the piping effecting the return to the tank R.

The slide-valve is braked in its movement by the displacement of liquid which takes place between the capacities 13 and 14 when passing through the calibrated opening 15. This braking is required for preventing an exchange of liquid at every oscillation of the vehicle.

The distributor control can be effected in several ways, but the essential point is that it be controlled in function of the height of the vehicle, this being taken in the axis of the latter, no matter what may be the tilt of the vehicle to right or left.

If a lever is fixed in the middle of the anti-rolling bar 2, the rotation movements F of the latter in relation to the chassis show the height at all times. The slide-valve 10 will be impelled by elastic connection to this lever 16, either towards the admission or towards the exhaust, according as to whether the vehicle is too low or too high.

In Figure 1, the connection is diagrammatically shown by a lever 16 fixed to the center of the anti-rolling bar, a spring 17 working alternately either by unwinding or winding up, connecting the lever 16 to a lever 18 freely turning on the anti-rolling bar 2. This lever 18 controls the movement of the slide-valve 10 of the distributor by means either of an axle, or as shown, by a yoke 19.

The elastic connection 17 is necessary, for, in the case where the two wheels are urged in the same direction, the angular movement of 16 around the axis $x$—$x$ is very great with regard to the movement of the lever 18 whose end can only move by about a maximum of 2 millimeters to either side of this normal position.

It is also possible to control the distributor as shown in Figure 2. The two arms 1 are connected by a small auxiliary torque bar 20, in the center of which there is welded a lever 21 partly surrounding the anti-rolling bar for the purpose of having a bearing point, but being free on the latter.

As in the case of Figure 1, the lever 21 is impelled to the right or left, when both arms are urged in the same direction. In the case of equal or inverse forces, the lever 21 remains motionless, for the height of the longitudinal axis of the vehicle has not altered.

It should be noticed that by operating the levers 18 or 21 by hand in one direction or the other, the vehicle raises or lowers accordingly. This facility can thus be employed for putting the vehicle up on chocks. More particularly, by chocking up one side of the vehicle, it is possible to remove the wheel without using the jack.

What I claim is:

1. An automatic device for maintaining wheeled vehicles at a uniform height from the ground no matter what the load and the flexibility of the springing, comprising for each wheel a supporting arm jointed at one end to the axle of the wheel and at the other end to the chassis, an elastic chambered hydraulic cylinder attached to the chassis, a piston in this chamber and a connecting rod operating this piston and connected at an intermediary point of the corresponding supporting arm, an anti-rolling torque bar connecting the ends of the arms on the side fixed to the chassis, a fluid distributor under pressure, a pressure accumulator, a fluid tank, piping connecting this distributor to the accumulator, tank and cylinders, a slide-valve in the distributor capable of putting the cylinder of each axle into communication with the pressure accumulator or tank, an auxiliary torque bar connecting the two arms, a lever fixed to this bar surrounding the anti-rolling bar and connected to the slide-valve of the distributor so as to control this slide-valve according to the upward efforts of the torque bars.

2. An automatic device for maintaining wheeled vehicles at a uniform height from the ground no matter what the load and the flexibility of the springing, comprising a supporting arm for each of the two opposite wheels jointed at one end to the axle of the wheel and at the other end to the chassis, an elastic chambered hydraulic cylinder for each arm attached to the chassis, a piston in said chamber and a connecting rod connecting each piston to an intermediate point of the corresponding supporting arm, an anti-rolling torque bar connecting the ends of the arms on opposite sides of the vehicle, a fluid distributor, a pressure accumulator, a fluid tank, piping connecting said distributor to the accumulator, to the tank and to the cylinders, said cylinders being interconnected whereby the same pressure exists in both cylinders, and means for controlling the distributor to connect said cylinders selectively with the accumulator and said means including a lever tiltable about the axis of said torque bar and means for tilting said lever in response to forces effecting rotation of said torque bar.

3. An automatic device for maintaining wheeled vehicles at a uniform height from the ground no matter what the load and the flexibility of the springing, comprising a supporting arm for each of the two opposite wheels jointed at one end to the axle of the wheel and at the other end to the chassis, an elastic chambered hydraulic cylinder for each arm attached to the chassis, a piston in said chamber and a connecting rod connecting each piston to an intermediate point of the corresponding supporting arm, an anti-rolling torque bar connecting the ends of the arms on opposite sides of the vehicle, a fluid distributor having a slide valve, a pressure accumulator, a fluid tank, piping connecting said distributor to the accumulator, to the tank and to the cylinders, said cylinders being interconnected whereby the same pressure exists in both cylinders, and means for controlling the distributor to connect said cylinders selectively with the accumulator and said means including a lever tiltable about the axis of said torque bar and means for tilting said lever in response to forces effecting rotation of said torque bar, said last-named means comprising a lever carried by the anti-rolling bar, a finger rotatable with this bar, an elastic connection between the lever and the finger and means connecting the lever with the distributor slide-valve.

References Cited in the file of this patent

UNITED STATES PATENTS 2,490,311    Rostu _____ Dec. 6, 1949